United States Patent [19]

Barnabeo

[11] Patent Number: 4,514,545

[45] Date of Patent: Apr. 30, 1985

[54] WATER CURABLE, AZIDE SULFONYL SILANE MODIFIED, ALKYLENE-ALKYL ACRYLATE COPOLYMERS

[75] Inventor: Austin E. Barnabeo, Bridgewater, N.J.

[73] Assignee: Union Carbide Corporation, Danbury, Conn.

[21] Appl. No.: 570,785

[22] Filed: Jan. 18, 1984

[51] Int. Cl.[3] ............................ C08F 8/34; C08F 8/00
[52] U.S. Cl. .................................. 525/330.4; 525/342
[58] Field of Search .............................. 525/342, 330.4

[56] References Cited

U.S. PATENT DOCUMENTS

| | | | |
|---|---|---|---|
| 3,585,103 | 6/1971 | Thomson | 161/191 |
| 3,705,911 | 12/1972 | Thomson | 260/349 |
| 3,706,592 | 12/1972 | Thomson | 117/72 |
| 3,715,371 | 2/1973 | Thomson | 260/349 |
| 3,813,351 | 5/1974 | Thomson | 260/2 EP |
| 4,343,917 | 8/1982 | Keogh | 525/342 |

FOREIGN PATENT DOCUMENTS 1264432 2/1972 United Kingdom .
1275120 5/1972 United Kingdom .

Primary Examiner—Christopher A. Henderson
Attorney, Agent, or Firm—James C. Arvantes; R. C. Brown

[57] ABSTRACT

The disclosure of this application is directed to water-curable, azide sulfonyl silane modified, alkylene-alkyl acrylate copolymers which are particularly useful as coverings about wires and cables providing insulation or jacketing thereon having improved elongation properties.

17 Claims, No Drawings

WATER CURABLE, AZIDE SULFONYL SILANE MODIFIED, ALKYLENE-ALKYL ACRYLATE COPOLYMERS

SUMMARY OF THE INVENTION

The disclosure of this application is directed to water curable, azide sulfonyl silane modified, alkylene-alkyl acrylate copolymers, produced by reacting an alkylene-alkyl acrylate copolymer with an azide sulfonyl silane. The water curable, azide sulfonyl silane modified, alkylene-alkyl acrylate copolymers of this invention are characterized by increased percent elongation with a concurrent increase in the degree of crosslinking with the result that these modified copolymers are especially useful as insulation and jacketing about wires and cables which are to be subjected to external forces normally encountered in the underground installation thereof.

BACKGROUND OF THE INVENTION

The introduction of olefin polymers as jacketing and insulation about wires and cables was an important development in the wire and cable industry. Olefin polymers were found to be corrosion resistant, abrasion resistant and to afford protection to the wires and cables about which they were extruded. Although olefin polymers have properties which make them desirable for use as insulation and jacketing material, they also have other properties which have presented problems. For example, olefin polymers were found to degrade upon aging. Consequently, antioxidants were added to olefin polymers in order to extend their working lives. It was also found that olefin polymers were degraded by the ultra-violet rays of the sun. This problem was solved by adding carbon black to the olefin polymers.

A problem which is still of concern to the wire and cable industry is the tendency of olefin polymers to crack and break, due to poor elongation characteristics, when subjected to external forces normally encountered when covered wires and cables are installed.

The solution to the problem of poor elongation has been generally approached from the standpoint of adding various additives to olefin polymers. This expedient, in many cases, has given rise to other problems due to the nature of the additives used.

DETAILED DESCRIPTION OF THE INVENTION

The present invention provides alkylene-alkyl acrylate copolymers which are unique in that they are water curable and characterized by increased percent elongation with a concurrent increase in the degree of crosslinking, without the addition thereto of special additives. As a result, the alkylene-alkyl acrylate copolymers of the present invention are especially useful as insulation and jacketing about wires and cables which are to be subjected to external forces as are normally encountered in the underground installation thereof.

The polymers of this invention are water curable, azide sulfonyl silane modified, alkylene-alkyl acrylate copolymers produced by reacting an alkylene-alkyl acrylate copolymer with a hydrolyzable, azide sulfonyl silane.

The alkylene-alkyl acrylate copolymers with which the silanes are reacted to form the silane modified copolymers are known copolymers produced by reacting an alkene with an alkyl acrylate.

Suitable alkenes are ethylene, propylene, butene-1, isobutylene, pentene-1, 2-methylbutene-1, 3-methylbutene-1, hexene, heptene-1, octene-1 and the like as well as mixtures thereof.

The alkylene moiety of the alkylene-alkyl acrylate copolymer generally contains from 2 to 18 carbon atoms inclusive, preferably 2 to 3 carbon atoms inclusive.

Suitable alkyl acrylate monomers which are copolymerized with the alkenes fall within the scope of the following formula:

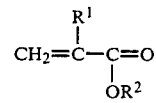

wherein $R^1$ is hydrogen or methyl and $R^2$ is alkyl having one to 8 carbon atoms inclusive. Illustrative compounds encompassed by this formula are: methyl acrylate, ethyl acrylate, t-butyl acrylate, methyl methacrylate, n-butyl acrylate, n-butylmethacrylate, 2-ethylhexyl acrylate and the like as well as mixtures thereof.

Alkylene-alkyl acrylate copolymers generally have a density (ASTM D-1505) with conditioning as in (ASTM D-147-72) of about 0.92 to about 0.94 and a melt index (ASTM-1238 of 44 psi tested pressure) of about 0.5 to about 500 decigrams per minute.

For purposes of the present invention, the preferred copolymer is a copolymer of ethylene-ethyl acrylate, generally having about one to about 50 percent by weight combined ethyl acrylate, preferably having about 2 to about 20 percent by weight combined ethyl acrylate.

Suitable hydrolyzable azide sulfonyl silanes and methods for the preparation thereof are described in U.S. Pat. No. 3,697,551 patented Oct. 10, 1972.

Illustrative hydrolyzable azide sulfonyl silanes fall within the scope of the following formula:

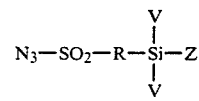

wherein R is a hydrocarbon radical, each V, which can be the same or different, is hydrogen, a hydrocarbon radical or a hydrolyzable group and Z is a hydrolyzable group.

Illustrative of suitable divalent hydrocarbon radicals for R are alkylene radicals having one to 18 carbon atoms inclusive, preferably one to 6 carbon atoms inclusive such as methylene, ethylene, propylene, butylene, hexylene and the like; aryl and cycloaliphatic radicals having 5 to 18 carbon atoms inclusive, preferably 6 to 8 carbon atoms inclusive such as cyclohexylene, phenylene, ethyl benzene and the like.

As stated, each V can be hydrogen, a hydrocarbon radical or a hydrolyzable group. Illustrative of such hydrocarbon radicals or hydrolyzable groups are alkyl radicals having one to 18 carbon atoms inclusive, preferably one to 6 carbon atoms inclusive such as methyl, ethyl, n-propyl, n-butyl, n-hexyl and the like; alkoxy radicals having one to 18 carbon atoms inclusive, preferably one to 6 carbon atoms inclusive such as methoxy, ethoxy, propoxy, hexoxy, dodecyloxy, methoxyethoxy and the like; aryl radicals having 6 to 8 carbon atoms inclusive such as phenyl, methyl phenyl, ethyl phenyl, oxy phenyl and the like; cycloaliphatic radicals having 5 to 8 carbon atoms inclusive such as cyclopentyl, cyclohexyl, oxycyclohexyl and the like.

Z, as previously stated, is a hydrolyzable group among which can be noted alkoxy, oxy aryl and oxy cycloaliphatic radicals as previously described for V; halogens such as chlorine and the like and other hydrolyzable groups as further described in U.S. Pat. No. 3,408,420 to John B. Wiggill, patented Oct. 29, 1968.

Specific azide sulfonyl silanes include among others, 5-(trimethoxysilyl)amylsulfonyl azide, 4-(triethoxysilyl)-cyclohexylsulfonyl azide, 2-methyl-4(trichlorosilyl)butyl-sulfonyl azide, 6-(trimethoxysilyl)hexylsulfonyl azide, 2-(trichlorosilyl)ethylsulfonyl azide, 2-(triethoxysilyl)ethylsulfonyl azide, 3-(methyldimethoxysilyl)propylsulfonyl azide, 3-(trimethoxysilyl)-propylsulfonyl azide, 4-(trimethoxysilyl)-benzenesulfonyl azide, 2-(trimethoxysilyl)ethylbenzenesulfonyl azide and the like.

The preparation of the silane modified copolymers of this invention is carried out by reacting an alkylene-alkyl acrylate copolymer with an azide sulfonyl halide at elevated temperatures. The temperatures can vary conveniently, from about 100° C. to about 250° C. and preferably from about 150° C. to about 190° C.

If desired, sources of energy, other than thermal energy can be used in order to carry out the reaction. These sources of energy include actinic light, radiation and the like.

The amount of azide sulfonyl silane used can vary from about 0.1 to about 4.0 and preferably from about 0.5 to about 2.0 percent by weight based on the weight of the copolymer.

The reaction can be carried out at atmospheric, subatmospheric or superatmospheric pressure, although atmospheric pressure is preferred.

Also, in conducting the reaction between the azide sulfonyl silane and the alkylene-alkyl acrylate copolymer, it is customary to have present an antioxidant and free radical scavenger. Among suitable free radical scavengers can be noted mercaptobenzothiazole, sulfur, tetramethylthiuramdisulfide and the like. Antioxidants and free radical scavengers are used in amounts well known in the art.

Recovery of the silane modified copolymer is effected by allowing the contents of the reaction flask to cool and discharging to a suitable receiver for storage preferably under an inert gas blanket.

The reaction can be carried out in any suitable apparatus, preferably an apparatus in which the copolymer is subjected to mechanical working such as a Brabender mixer, a Banbury mixer or an extruder.

The reaction between the alkylene-alkyl acrylate copolymer and the azide sulfonyl silane can be depicted by the following equation:

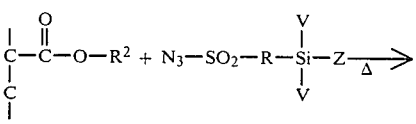

Segment of an alkylene-alkyl acrylate copolymer

-continued

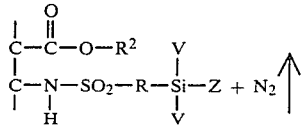

wherein the variables are as previously defined.

The curing or crosslinking of the silane modified alkylene-alkyl acrylate copolymer is effected by exposing the copolymer to moisture. The moisture present in the atmosphere is usually sufficient to permit curing to occur over a period of 48 hours.

The rate of curing can be accelerated by exposure to an artificially humidified atmosphere or immersion in heated water or by exposure to steam.

Generally, curing is effected at temperatures on the order of about 23° C. to about 100° C., preferably about 70° C. to about 100° C.

Additionally, the crosslinking can be carried out in the presence of a silanol condensation catalyst.

A wide variety of materials which function as silanol condensation catalysts and which are known in the art can be employed in the crosslinking process. Such materials include metal carboxylates such as dibutyltin dilaurate; organic bases such as ethylamine, hexylamine, dubutylamine, piperidine and the like; and acids such as mineral acids and fatty acids and the like.

To the silane modified copolymers of this invention can be added various additives, in amounts well known in the art, such as fillers, among which can be mentioned carbon black, clay, talc (magnesium silicate), calcium carbonate, silica, alumina hydroxide and the like, coupling agents and the like.

The silane modified copolymers can be rendered flame retardant by the addition thereto of halogen containing flame retardants such as decabromodiphenyl oxide, chlorinated polyethylene, polyvinyl chloride and halogenated paraffin waxes, ethylene-bis(tetrabromophthalimide) alone or in admixture with organic or inorganic antimony compounds such as antimony oxide and/or alkaline earth metal oxides, carbonates, hydroxides and sulfates. Among such alkaline earth metal compounds can be noted calcium oxide, calcium carbonate, calcium hydroxide, calcium sulfate, magnesium oxide, magnesium carbonate, magnesium hydroxide and magnesium sulfate.

It is to be noted that the disclosures of all patents noted are incorporated herein by reference.

In the following examples, which are illustrative of the present invention, the azide sulfonyl silane used was obtained from Hercules, Inc. as Product 5-3076. This product has the formula:

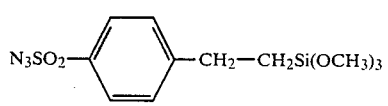

2-(trimethoxysilyl)ethylbenzene sulfonyl azide

EXAMPLE 1

Seventy-five grams of an ethylene-ethyl acrylate copolymer, having a melt index of 3.5 and containing about 18 percent by weight combined ethyl acrylate, 0.3 gram of tetramethylthiuramdisulfide and 0.6 gram of 1,2-dihydro-2,3,4-trimethylquinoline, an antioxidant, were placed in a Brabender mixer which was set to operate at 40 rpm, at a temperature of 140° C., under an argon gas atmosphere and fluxed therein for 2 minutes. At the end of the 2 minute period, an additional 25 grams of the ethylene-ethyl acrylate copolymer, pretreated with a azide sulfonyl silane, were added to the Brabender and mixing continued for another 2 minutes.

The 25 gram batch of ethylene-ethyl acrylate copolymer was pretreated by tumbling with 4.0 grams of a 50 percent by weight solution of azide sulfonyl silane in methylene chloride. Tumbling was carried out at room temperature for 5 minutes in a dried glass jar. The methylene chloride was then removed by placing the jar in a vacuum oven, operating under a vacuum and at room temperature. The 25 gram batch of ethylene-ethyl acrylate copolymer containing 2 grams of the azide sulfonyl silane was then added to the Brabender mixer. Using a methylene chloride solution of the azide sulfonyl silane maintained the stability of the silane until it was actually used.

Contents of the Brabender mixer were heated to a temperature of 180° C. and maintained at this temperature, with mixing, for 20 minutes. At the end of the 20 minute period, dibutyltin dilaurate, in an amount of 0.03 gram, was added and mixing continued for another minute. The reaction product, an ethylene-ethyl acrylate copolymer having grafted thereto an azide sulfonyl silane, contained repeating units of the following idealized formula:

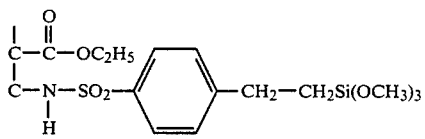

The reaction product was removed from the Brabender mixer and molded into plaques having dimensions of 3.5 inches by 3.5 inches by 0.075 inch (thickness). Plaques were molded in a press under the following conditions:

| Pressure | 200 psi | | 5,000 psi |
|---|---|---|---|
| Temperature | 130° C. | followed | 130° C. |
| Time Cycle | 7 minutes | by: | 3 minutes |

Monsanto Rheometer determinations were made with respect to a plaque as prepared (Initial Reading) and with respect to a plaque which had been water cured by being placed in a water bath, which was at a temperature of 70° C., for 16 hours (Final Reading).

| Monsanto Rheometer | Initial Reading | Final Reading |
|---|---|---|
| Lbs-Inch | 4 | 20 |

EXAMPLE 2

This example was conducted in a manner described in Example 1, using the same materials and the same amounts thereof with the exception that 5.0 grams of a 50 percent by weight solution of azide sulfonyl silane in methylene chloride was used.

Plaques were prepared and tested in a manner described in Example 1.

| Monsanto Rheometer | Initial Reading | Final Reading |
|---|---|---|
| Lbs-Inch | 9 | 33 |

EXAMPLE 3

This example illustrates that an alkylene-alkyl acrylate copolymer, highly filled with various additives, can be reacted with an azide sulfonyl silane to obtain a water curable, alkylene-alkyl acrylate copolymer, in accordance with this invention.

A composition, the formulation of which is set forth below, was prepared and charged into a Brabender mixer which was operating under the conditions described in Example 1.

| Formulation | Parts by Weight |
|---|---|
| Ethylene-ethyl acrylate copolymer Melt Index of 1.3 Containing about 11 percent By weight combined ethyl acrylate | 56.1 |
| Antimony oxide | 2.5 |
| Calcium carbonate | 2.6 |
| Ethylene bis(tetra-bromophthalimide) | 16.3 |
| Mercaptobenzothiazole | 1.0 |
| 1,2-dihydro-2,3,4-trimethylquinoline | 0.6 |
| Vinyl-tris(2-methoxyethoxy)silane (coupling agent) | 0.2 |

The composition was fluxed in a manner, described in Example 1. To this fluxed composition, there was then added a mixture of 20.7 grams of talc (coated with zinc stearate) and one gram of azide sulfonyl silane. The talc-silane mixture was prepared by pretreating the talc with 2.0 grams of a 50 percent solution of azide sulfonyl silane in methylene chloride and removing the methylene chloride, all in a manner described in Example 1. The contents of the Brabender mixer were then heated to a temperature of 180° C. and maintained at this temperature, with mixing for 30 minutes. At the end of the 30 minute period, dibutyltin dilaurate, in an amount of 0.03 gram, was added to the contents of the Brabender and mixing continued for another minute.

The reaction product was removed from the Brabender and plaques prepared therefrom and tested in a manner described in Example 1.

| Monsanto Rheometer | Initial Reading | Final Reading |
|---|---|---|
| Lbs-Inch | 8 | 29 |

EXAMPLE 4

This example was conducted in a manner described in Example 3, using the same materials and the same amounts thereof with the exception that 3.0 grams of a 50 percent by weight solution of azide sulfonyl silane in methylene chloride were used.

Plaques were prepared and tested in a manner described in Example 1.

| Monsanto Rheometer | Initial Reading | Final Reading |
|---|---|---|
| Lbs-Inch | 13 | 46 |

EXAMPLE 5

This example was conducted in a manner described in Example 3, using the same materials and same amounts thereof with the exception that 4.0 grams of a 50 percent by weight solution of azide sulfonyl silane in methylene chloride were used.

Plaques were prepared and tested in a manner described in Example 1.

| Monsanto Rheometer | Initial Reading | Final Reading |
|---|---|---|
| Lbs-Inch | 14 | 58 |

Tensile Strength (ASTMD-412) and Percent Elongation (ASTMD-412) determinations were made with respect to the silane modified ethylene-ethyl acrylate copolymers of Examples 3, 4 and 5 and compared to the Tensile Strength and Percent Elongation determinations of a similar silane modified ethylene-ethyl acrylate copolymer prepared according to Example 1B of U.S. Pat. No. 4,328,123 by reacting:

1. an ethylene-ethyl acrylate copolymer having a melt index of 1.2 and containing about 16 percent by weight combined ethyl acrylate with a
2. polysiloxane prepared as described in Example 3 of U.S. Pat. No. 4,328,123 except that the polysiloxane was end blocked with ethyl laurate rather than with ethyl benzoate.

A comparison of Tensile Strength and Percent Elongation determinations of the azide sulfonyl silane modified copolymers of this invention and the polysiloxane modified copolymers, at the same cure levels, is set forth below in Table 1. Cure levels were determined as previously described.

TABLE I

| Monsanto Rheometer (Lbs-Inch) - Final Reading | Tensile Strength (Percent) | | Elongation (Percent) | |
|---|---|---|---|---|
| | Azide Silane | Polysiloxane | Azide Silane | Polysiloxane |
| 29 | 1530 | 1570 | 150 | 130 |
| 46 | 1840 | 1650 | 187 | 75 |
| 58 | 1830 | 1700 | 177 | 53 |

As can be seen, although essentially comparable tensile strengths were found in both the azide silane modified copolymers and the polysiloxane modified copolymers, the polysiloxane modified copolymers underwent a decrease in elongation with increasing cure. No such decrease was found to occur with the azide silane modified copolymers of the present invention.

EXAMPLE 6

This example was conducted in a manner described in Example 1, using the same materials and the same amounts thereof with the exception that 3.5 grams of a 50 percent by weight solution of azide sulfonyl silane in methylene chloride was used.

Plaques were prepared and tested in a manner described in Example 1.

| Monsanto Rheometer | Initial Reading | Final Reading |
|---|---|---|
| Lbs-Inch | 4 | 22 |

EXAMPLE 7

This example was conducted in a manner described in Example 1, using the same materials and the same amounts thereof with the exception that 5.0 grams of a 50 percent by weight solution of sulfonyl azide silane in methylene chloride was used.

Plaques were prepared and tested in a manner described in Example 1.

| Monsanto Rheometer | Initial Reading | Final Reading |
|---|---|---|
| Lbs-Inch | 8 | 33 |

EXAMPLE 8

This example was conducted in a manner described in Example 1, using the same materials and the same amounts thereof with the exception that 6.0 grams of a 50 percent by weight solution of azide sulfonyl silane in methylene chloride was used.

Plaques were prepared and tested in a manner described in Example 1.

| Monsanto Rheometer | Initial Reading | Final Reading |
|---|---|---|
| Lbs-Inch | 5 | 36 |

Percent Elongation determinations were made with respect to the azide silane modified ethylene-ethyl acrylate copolymers of Examples 6 and 8 and compared to the Percent Elongation determinations of polysiloxane modified ethylene-ethyl acrylate copolymers, prepared as previously described and having the same degree of "cure". Results are tabulated below in Table II.

TABLE II

| Monsanto Rheometer (Lbs-Inch) - Final Reading | Elongation (Percent) | |
|---|---|---|
| | Azide Silanes | Polysiloxanes |
| 22 | 360 | 223 |
| 36 | 340 | 165 |

What is claimed is:

1. A water curable polymer of a hydrolyzable azide sulfonyl silane and an alkylene-alkyl acrylate copolymer having about one to about 50 percent by weight combined alkyl acrylate.

2. A water curable polymer as defined in claim 1 wherein the alkylene-alkyl acrylate copolymer has the formula:

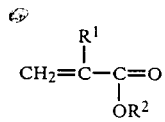

$$CH_2=C-C=O \atop \underset{OR^2}{\overset{R^1}{|}}$$

wherein $R^1$ is hydrogen or methyl and $R^2$ is alkyl having one to 18 carbon atoms inclusive.

3. A water curable polymer as defined in claim 1 wherein the alkylene-alkyl acrylate copolymer is an ethylene-ethyl acrylate copolymer.

4. A water curable polymer as defined in claim 1 wherein the hydrolyzable azide sulfonyl silane has the formula:

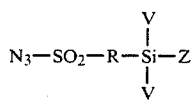

wherein R is a hydrocarbon radical, each V is hydrogen, a hydrocarbon radical or a hydrolyzable group and Z is a hydrolyzable group.

5. A water curable polymer as defined in claim 4 wherein R is ethyl benzene, each V and Z are alkoxy radicals.

6. A water curable polymer as defined in claim 5 wherein each V and Z are methoxy.

7. A water curable polymer as defined in claim 1 wherein the said silane is 2-(trimethoxysilyl)ethylbenzenesulfonyl azide and the alkylene-alkyl acrylate copolymer is an ethylene-ethyl acrylate copolymer.

8. The crosslinked product of the polymer of claim 1.

9. A reactive composition comprising a hydrolyzable azide sulfonyl silane and an alkylene-alkyl acrylate copolymer having about one to about 50 percent by weight combined alkyl acrylate.

10. A reactive composition as defined in claim 9 wherein the alkylene-alkyl acrylate copolymer has the formula:

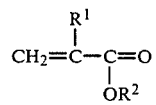

wherein $R^1$ is hydrogen or methyl and $R^2$ is alkyl having one to 8 carbon atoms inclusive.

11. A reactive composition as defined in claim 9 wherein the alkylene-alkyl acrylate copolymer is an ethylene-ethyl acrylate copolymer.

12. A reactive composition as defined in claim 9 wherein the hydrolyzable azide sulfonyl silane has the formula:

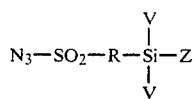

wherein R is a hydrocarbon radical, each V is hydrogen, a hydrocarbon radical or a hydrolyzable group and Z is a hydrolyzable group.

13. A reactive composition as defined in claim 12 wherein R is ethylbenzene, each V and Z are alkoxy radicals.

14. A reactive composition as defined in claim 13 wherein each V and Z are methoxy.

15. A reactive composition as defined in claim 9 wherein the said silane is 2-(trimethoxysilyl)ethylbenzene sulfonyl azide and the alkylene-alkyl acrylate copolymer is an ethylene-ethyl acrylate copolymer.

16. A water curable polymer as defined in claim 1 wherein the alkylene-alkyl acrylate copolymer has about 2 to about 20 percent by weight combined alkyl acrylate.

17. A reactive composition as defined in claim 9 wherein the alkylene-alkyl acrylate copolymer has about 2 to about 20 percent by weight combined alkyl acrylate.

* * * * *

UNITED STATES PATENT AND TRADEMARK OFFICE
CERTIFICATE OF CORRECTION

PATENT NO. : 4,514,545
DATED : April 30, 1985
INVENTOR(S) : Austin E. Barnabeo

It is certified that error appears in the above-identified patent and that said Letters Patent is hereby corrected as shown below:

Column 4, line 27, "dubutylamine" should read -- dibutylamine --

Claim 2, line 2, before "alkylene" insert -- alkyl acrylate of the --

Claim 10, line 2, before "alkylene" insert -- alkyl acrylate of the --

Signed and Sealed this

Thirteenth Day of August 1985

[SEAL]

Attest:

DONALD J. QUIGG

Attesting Officer

Acting Commissioner of Patents and Trademarks